United States Patent
Suzuki et al.

(10) Patent No.: US 10,476,962 B2
(45) Date of Patent: Nov. 12, 2019

(54) DRIVING ASSIST DEVICE

(71) Applicant: DENSO CORPORATION, Kariya, Aichi-pref (JP)

(72) Inventors: Tadao Suzuki, Kariya (JP); Motonori Ando, Kariya (JP)

(73) Assignee: DENSO CORPORATION, Kariya (JP)

(*) Notice: Subject to any disclaimer, the term of this patent is extended or adjusted under 35 U.S.C. 154(b) by 6 days.

(21) Appl. No.: 14/986,961

(22) Filed: Jan. 4, 2016

(65) Prior Publication Data

US 2016/0253904 A1  Sep. 1, 2016

(30) Foreign Application Priority Data

Feb. 26, 2015  (JP) .................................. 2015-37253

(51) Int. Cl.
| | |
|---|---|
| G06F 19/00 | (2018.01) |
| G06G 7/70 | (2006.01) |
| G06G 7/76 | (2006.01) |
| G06G 1/00 | (2006.01) |
| H04L 29/08 | (2006.01) |
| B60Q 9/00 | (2006.01) |
| G08G 1/16 | (2006.01) |
| H04L 1/00 | (2006.01) |
| H04L 1/20 | (2006.01) |

(52) U.S. Cl.
CPC .............. *H04L 67/12* (2013.01); *B60Q 9/008* (2013.01); *G08G 1/163* (2013.01); *H04L 1/00* (2013.01); *H04L 1/20* (2013.01)

(58) Field of Classification Search
CPC ..................................................... G08G 1/161
See application file for complete search history.

(56) References Cited

U.S. PATENT DOCUMENTS

2003/0076221 A1* 4/2003 Akiyama .......... H04L 12/40182
  340/12.32
2003/0102997 A1* 6/2003 Levin ...................... G01S 7/006
  342/57

(Continued)

FOREIGN PATENT DOCUMENTS

| JP | 2004-265046 A | 9/2004 |
| JP | 2005-051477 A | 2/2005 |

(Continued)

*Primary Examiner* — Imran K Mustafa

(57) ABSTRACT

A receiving unit receives a signal in a frequency band used in vehicle-to-vehicle communications or shared by vehicle-to-vehicle communications and road-to-vehicle communications. A demodulation unit demodulates the signal received with the receiving unit. A received signal strength detection unit detects a received signal strength of the signal received with the receiving unit. A demodulation state determination unit determines whether the signal, which is received with the receiving unit, is demodulated successfully. A notification processing unit notifies a driver of a possibility of existence of another vehicle in a condition where the demodulation state determination unit determines that the signal is not demodulated successfully and where the received signal strength is greater than or equal to a predetermined strength threshold, which is for determining whether signals sent from multiple other vehicles collide against each other.

9 Claims, 4 Drawing Sheets

(56) References Cited

U.S. PATENT DOCUMENTS

| | | | |
|---|---|---|---|
| 2007/0096885 A1* | 5/2007 | Cheng | B60W 40/04 340/435 |
| 2008/0037577 A1 | 2/2008 | Nagura | |
| 2011/0019577 A1* | 1/2011 | Nagura | H04L 1/1657 370/252 |
| 2013/0088954 A1* | 4/2013 | Sakamoto | H04W 24/08 370/228 |
| 2013/0131949 A1 | 5/2013 | Shida | |
| 2014/0092735 A1* | 4/2014 | Lee | H04W 28/0231 370/230 |
| 2015/0146605 A1* | 5/2015 | Rubin | G08G 9/02 370/312 |

FOREIGN PATENT DOCUMENTS

| | | |
|---|---|---|
| JP | 2008-257582 A | 10/2008 |
| JP | 2009-139998 A | 6/2009 |
| JP | 2010016570 A * | 1/2010 |
| JP | 2010-076562 A | 4/2010 |
| JP | 2011-28639 A | 2/2011 |
| JP | 2011-038925 A | 2/2011 |
| JP | 5265027 B2 | 8/2013 |
| JP | 2014-086750 A | 5/2014 |

* cited by examiner

DRIVING ASSIST DEVICE

CROSS REFERENCE TO RELATED APPLICATION

This application is based on reference Japanese Patent Application No. 2015-037253 filed on Feb. 26, 2015, the disclosure of which is incorporated herein by reference.

TECHNICAL FIELD

The present disclosure relates to a driving assist device equipped in a vehicle to assist an operation of a driver according to information retrieved by implementing communications between a vehicle and a vehicle or another device.

BACKGROUND

In recent years, a vehicle-to-vehicle-communications system is proposed. In a vehicle-to-vehicle-communications system, each of multiple vehicles sends a communication packet to another vehicle and receives successively a communication packet sent from another vehicle. The communication packet indicates vehicle information, such as a traveling speed, a present position, and a traveling direction of a primary vehicle of a driver. A driving assist device may be employed in such a vehicle-to-vehicle-communications system. The driving assist device may assist an operation of a driver according to vehicle information on a primary vehicle and vehicle information on another vehicle. The other vehicle may include multiple vehicles. The vehicle information on another vehicle is retrieved through vehicle-to-vehicle communications.

For example, Patent Document 1 discloses a technology to determine whether a primary vehicle makes physical contact with another vehicle according to both vehicle information on the primary vehicle and vehicle information on another vehicle. The vehicle information on the other vehicle is specified by a received communication packet. The technology of Patent Document 1 further warns a driver to avoid physical contact with the other vehicle on determination that the physical contact possibility occurs.

As described in Patent Document 1, the above-described vehicle-to-vehicle-communications system employs the carrier sense multiple access/collision avoidance (CSMA/CA) mechanism as an access control system.

The communication between a vehicle and a roadside equipment installed on a roadside may use same frequency as vehicle-to-vehicle communications, for example, using CSMA/CA.

(Patent Document 1)
Japanese Patent Gazette No. 5265027

A driving assist device of the primary vehicle receives a communication packet sent from a certain vehicle thereby to retrieve information about the vehicle. In addition, the driving assist device receives a communication packet from another vehicle, from which the driving assist device has not received a communication packet, thereby to recognize existence of the vehicle for the first time.

It is noted that, the vehicle-to-vehicle-communications system employs the CSMA/CA mechanism. Therefore, communication packets, which are sent from multiple vehicles, may collide against each other. Thus, there may be the case that the driving assist device of the primary vehicle cannot demodulate the received communication packet successfully.

In a state where the driving assist device has not demodulate a communication packet sent from a certain vehicle (first another vehicle) successfully yet, a communication packet, which is sent from the first another vehicle, may collide against a communication packet, which is sent from another vehicle (second another vehicle). In this case, the driving assist device cannot recognize existence of the first another vehicle continually for a time period.

Consequently, the driving assist device cannot notify a driver of existence of the first another vehicle, even though the first another vehicle exists at a position and may make physical contact with the primary vehicle.

SUMMARY

It is an object of the present disclosure to produce a driving assist device configured to notify a driver of existence of another vehicle in the surroundings of the primary vehicle, even when a communication packet sent from the vehicle cannot be received successfully.

According to an aspect of the present disclosure, a driving assist device comprises a receiving unit configured to receive a signal in a frequency band, which is used in vehicle-to-vehicle communications, or in a frequency band, which is shared by vehicle-to-vehicle communications and road-to-vehicle communications. The driving assist device further comprises a demodulation unit configured to demodulate the signal received with the receiving unit. The driving assist device further comprises a received signal strength detection unit configured to detect a received signal strength of the signal received with the receiving unit. The driving assist device further comprises a demodulation state determination unit configured to determine whether the signal, which is received with the receiving unit, is demodulated successfully. The driving assist device further comprises a notification processing unit configured to notify a driver of a possibility of existence of another vehicle in a condition where: the demodulation state determination unit determines that the signal is not demodulated successfully; and the received signal strength of the signal is greater than or equal to a predetermined strength threshold, which is for determining whether signals sent from multiple other vehicles collide against each other.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

Figure 1:
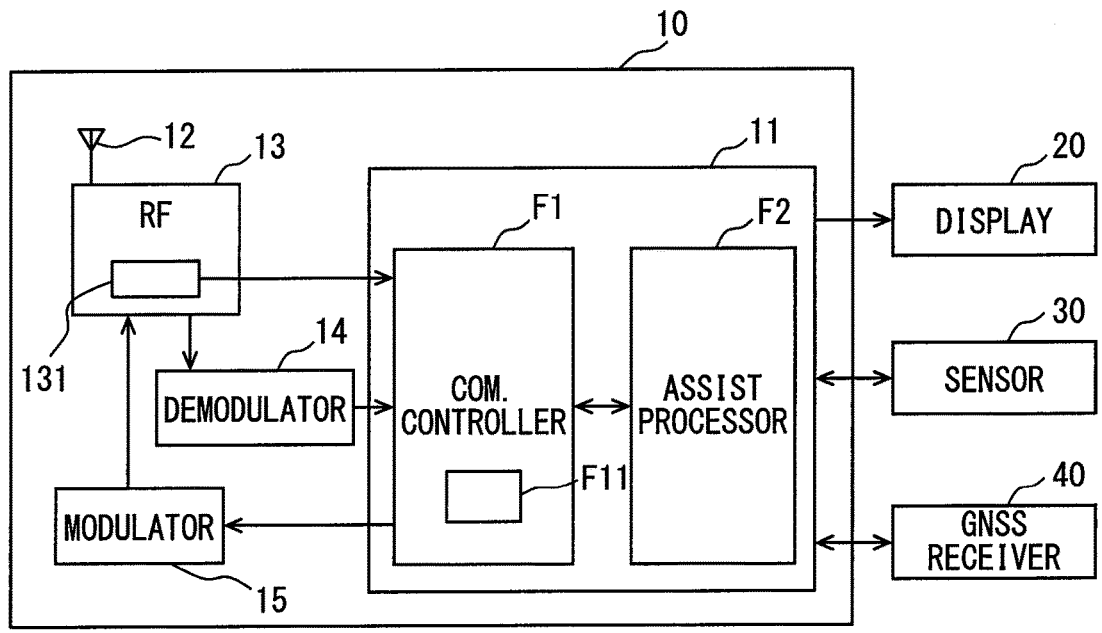
FIG. 1 is a block diagram showing an example of a configuration of a driving assist device according to one embodiment.

As follows, embodiments of the present disclosure will be described with reference drawings. FIG. 1 shows an example of a configuration of a driving assist device 10 according to the present embodiment. In FIG. 1, the driving assist device 10 is equipped in a vehicle. The driving assist device 10 is connected with a display device 20, vehicular sensors 30, and a global navigation satellite system receiver (GNSS receiver) 40 via a generally known in-vehicle network. In the following description, the vehicle equipped with the driving assist device 10 is denoted by a primary vehicle.

The display device 20 indicates an image based on an instruction from the driving assist device 10. The image may include a text character. For example, the display device 20 may be an indication apparatus located around a center of an instrument panel in a width direction of the vehicle. In other forms, the display device 20 may be an indication apparatus equipped in a meter unit and/or may be a generally known head-up display device.

The vehicular sensor 30 is equipped in the primary vehicle. The vehicular sensor 30 may include various sensors. The vehicular sensor 30 may be a speed sensor, an accelerometer, a gyroscope, a geomagnetism sensor, and/or the like. The GNSS receiver 40 is configured to receive an electric wave from a satellite (GNSS satellite) used for the global navigation satellite system (GNSS). In this way, the GNSS receiver 40 retrieves information, which indicates a present position of the GNSS receiver 40. The present position may be specified by, for example, latitude and longitude.

The driving assist device 10 implements generally known vehicle-to-vehicle communications with another vehicle, which exists in the surroundings of the primary vehicle. The driving assist device 10 assists a driving operation of a driver according to information, which is sent from another vehicle via the vehicle-to-vehicle communications, and a state of the primary vehicle. The driving assist device 10 may further assist recognition of a surrounding condition. For example, the driving assist device 10 determines whether a possibility of collision of the primary vehicle with another vehicle exists. The driving assist device 10 further warns the driver about the possibility of collision with another vehicle when determining that the possibility of collision exists. The surroundings of the primary vehicle represent a wireless-communications area equivalent to a range in which the vehicle-to-vehicle communications are available.

The vehicle-to-vehicle communications employ, as an access control system, carrier sense multiple access/collision avoidance (CSMA/CA). Each vehicle, which implements the vehicle-to-vehicle communications, detects a usage condition (busy condition) of a carrier thereby to perform carrier sense. Further, on determination that the carrier is not used (not busy) according to a result of the carrier sense, each vehicle broadcasts a communication packet (packet), which indicates vehicle information on the vehicle.

The vehicle information, which is contained in the packet sent from each vehicle, may include a traveling speed of the vehicle (sender), a traveling direction of the vehicle, a present position of the vehicle, and/or the like. In the present embodiment, each vehicle implements the vehicle-to-vehicle communications by using an electric wave in a 700-MHz band. It is noted that, each vehicle may use an electric wave in a different frequency such as a 5.9-GHz band.

The packet sent from each vehicle contains a terminal ID, which is distinctive to the vehicle. Therefore, a vehicle, which receives the packet, is enabled to distinguish a vehicle, which sends the packet, from another vehicle according to the terminal ID included in the packet.

As shown in FIG. 1, the driving assist device 10 includes a control unit 11, an antenna 12, a radiofrequency unit (RF unit) 13, a demodulation unit 14, and a modulation unit 15. The RF unit 13 is connected and communicated with each of the antenna 12, the demodulation unit 14, and the modulation unit 15. The control unit 11 is connected and communicated with each of the RF unit 13, the demodulation unit 14, and the modulation unit 15.

The control unit 11 controls an operation of whole of the driving assist device 10. The control unit 11 may be configured as a general computer. The control unit 11 may include a generally known computer elements such as a CPU, a memory, a storage device, an I/O interface, and a bus line which connects the computer elements with each other.

The CPU may be a generally known central processing unit. The CPU implements various processing by using the memory as a processing work area. The memory and/or the storage device may be a non-transitory storage medium. The memory is, for example, a temporary storage medium, such as a RAM. The storage device is, for example, a nonvolatile storage medium, such as ROM and/or a flash memory. The storage device stores a program module, data, a terminal ID, and/or the like. The program module and the data are used by the CPU to execute various processings. The terminal ID is assigned to the driving assist device 10. The I/O interface controls data exchange implemented between the control unit 11 and a device, which is connected with the control unit 11, such as the RF unit 13 and/or the display device 20.

It is noted that, in FIG. 1, the demodulation unit 14, the modulation unit 15, and the control unit 11 are illustrated as independent blocks in view of convenience of explanation. It is noted that, the control unit 11 may include a function corresponding to the demodulation unit 14 and/or the modulation unit 15. A communication control unit F1 of the control unit 11 may include this function. It is further noted that, a function of the control unit 11 may be partially or entirely configured with hardware such as one or more ICs.

The control unit 11 includes the communication control unit F1 and an assist processing unit F2 as functional blocks. The functional blocks are produced by implementing the program stored in the storage device. The communication control unit F1 is a functional block mainly to execute vehicle-to-vehicle communications. The assist processing unit F2 is a functional block to execute a processing to assist a driving operation of a driver according to data received by the vehicle-to-vehicle communications. The communication control unit F1 and the assist processing unit F2 may be produced as a singular CPU and may be produced as different (separate) CPUs. In advance of detailed description of the control unit 11, the antenna 12, the RF unit 13, the demodulation unit 14, and the modulation unit 15 will be first described.

The antenna 12 is an antenna device configured to send and receive an electric wave in a frequency band used for vehicle-to-vehicle communications. The RF unit 13 amplifies signal received with the antenna 12 and implements quadrature demodulation on the signal thereby to convert the signal into a baseband signal and to send the converted baseband signal to the demodulation unit 14. The RF unit 13 may be equivalent to a receiving unit. The RF unit 13 converts the signal received from the modulation unit 15 into a high-frequency signal and causes the antenna 12 to send the converted high-frequency signal in a wireless manner.

Furthermore, the RF unit 13 includes a received signal strength detection unit 131, which detects a received signal strength of the signal received by using the antenna 12. The RF unit 13 sends a signal to the communication control unit F1 according to the receiving signal strength of the signal received by using the antenna 12. The received signal strength detection unit 131 may be produced as a generally known received signal strength detection circuit, which is configured to send a signal according to a received signal strength.

The demodulation unit 14 demodulates the received signal, which is received by using the RF unit 13, to produce demodulated data. The demodulation unit 14 sends the demodulated data to the communication control unit F1. More specifically, the demodulation unit 14 converts the signal from the RF unit 13 into a digital signal. The demodulation unit 14 further implements, on the converted digital data, various processings, such as a synchronous detection processing, a propagation path estimation processing, and an equalization processing. Furthermore, the demodulation unit 14 implements an error correction decoding processing. That is, the demodulation of the received signal includes the processings to the decoding. Subsequently, the demodulation unit 14 sends a bit sequence, as decoded data of the received signal, to the control unit 11.

The modulation unit 15 implements processings such as error correcting and encoding, modulating, digital-to-analog conversion and/or the like on the data, which is sent from the communication control unit F1. Thus, the modulation unit 15 sends the processed data to the RF unit 13.

The communication control unit F1 of the control unit 11 controls operations of the RF unit 13, the demodulation unit 14, and the modulation unit 15 to cause transmission of a packet, which indicates vehicle information on the primary vehicle. In addition, the communication control unit F1 receives a packet sent from another vehicle and successively provides information, which is specified by the packet, to the assist processing unit F2.

Specifically, when causing transmission of a packet, the communication control unit F1 first produces the packet in a predetermined format according to data, which is sent from the assist processing unit F2. The communication control unit F1 stores the produced packet in a transmission queue. Subsequently, the communication control unit F1 performs carrier sense to detect the usage condition of the carrier. Thus, the communication control unit F1 determines whether the carrier is used (or busy). Subsequently, when determining that the carrier is not used (or not busy), the communication control unit F1 sends the packet, which is stored in the transmission queue, to the modulation unit 15. Thus, the communication control unit F1 causes the modulation unit 15 to send the packet. A generally known method may be employed as a determination method whether the carrier is used.

When the RF unit 13 receives a signal, the communication control unit F1 retrieves a bit sequence, which corresponds to the received signal demodulated by the demodulation unit 14. Further, the communication control unit F1 determines whether the demodulation unit 14 demodulates the received signal successfully.

The communication control unit F1 includes a demodulation success-or-failure determination unit (demodulation state determination unit) F11 as a functional block. The demodulation success-or-failure determination unit F11 determines whether the demodulation unit 14 demodulates the signal, which is received by the RF unit 13, successfully. When the bit sequence retrieved from the demodulation unit 14 is not in compliance with the format, which is employed in the vehicle-to-vehicle communications, the demodulation state determination unit F11 determines that the received signal is not demodulated successfully.

More specifically, the demodulation state determination unit F11 makes this failure determination when, for example, a bit sequence, which corresponds to the received signal, does not include a frame, which is supposed to be included in a packet of the vehicle-to-vehicle communications. Alternatively, the demodulation state determination unit F11 makes this failure determination when, for example, a number of bits of the bit sequence, which corresponds to the received signal, differs from a number of bits, which is specified for the packet of the vehicle-to-vehicle communications. In addition, the demodulation state determination unit F11 determines that the received signal is not demodulated successfully when an error correcting code, which is included in the received signal, is not correctable.

The demodulation unit 14 may have a function to self-judge whether the received signal is not demodulated due to a predetermined error, which occurs in a process executing various processings such as a synchronous detection processing and/or an error correction decoding processing. In this case, the demodulation state determination unit F11 may determine that the received signal is not demodulated successfully when the demodulation unit 14 self-judges that the received signal is not demodulated. For example, when the demodulation unit 14 detects an uncorrectable error in the error correction decoding processing, the demodulation state determination unit F11 may determine that the received signal is not demodulated successfully. It is noted that, when detecting an uncorrectable error in the error correction decoding processing, the demodulation unit 14 notifies the demodulation state determination unit F11 of the detection of the uncorrectable error.

When the demodulation state determination unit F11 determines that the demodulation unit 14 does not demodulate the received signal successfully, the communication control unit F1 determines whether the received signal strength, which is detected by the received signal strength detection unit 131 on the received signal, is greater than or equal to a predetermined threshold (strength threshold).

The strength threshold is for distinguishing whether a packet collision occurs or whether a mere, noise is received. The strength threshold may be a value corresponding to a received signal strength observed when a packet collision occurs. For example, various experiments may be performed to determine an expected value or a lower limit of the received signal strength, which is observed when a packet collision occurs. Thus, the expected value or the lower limit may be employed as the strength threshold.

Subsequently, when the demodulation state determination unit F11 determines that the demodulation unit 14 does not demodulate the received signal successfully and when the received signal strength of the received signal is greater than or equal to the predetermined strength threshold, the communication control unit F1 sends a message, which indicates occurrence of a packet error, to the assist processing unit F2.

It is noted that, the data, which includes a bit sequence demodulated successfully, is a packet, which indicates vehicle information on another vehicle. When the demodulation state determination unit F11 determines that the received signal is demodulated successfully, the communication control unit F1 extracts, from the demodulated data, a terminal ID, which is information indicating a sender of the packet, and data, which indicates vehicle information. Thus, the communication control unit F1 sends the extracted terminal ID and the extracted data to the assist processing unit F2.

The assist processing unit F2 executes a predetermined processing for assisting an operation of a driver. In the present one example, when the primary vehicle approaches an intersection, the assist processing unit F2 executes a processing to prompt a driver of the primary vehicle to pay attention to another vehicle, which travels on a cross road. The cross road intersects with a road, on which the primary vehicle travels. This processing is one example of an assisting processing executed by the assist processing unit F2. The assist processing unit F2 is configured to implement various assisting processings other than this processing.

Figure 2:
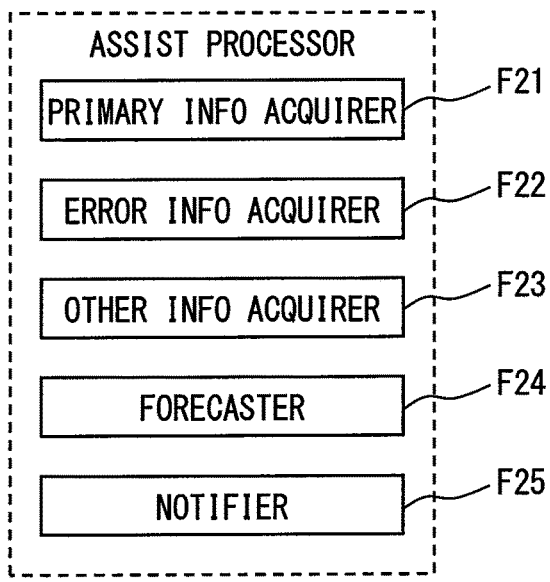
FIG. 2 is a functional block diagram showing functions of an assist processing unit according to the embodiment.

As shown in FIG. 2, the assist processing unit F2 includes, as further segmented functional blocks, a primary vehicle information acquisition unit F21, a packet error information acquisition unit F22, an other-vehicle information acquisition unit F23, a collision forecasting unit F24, and a notification processing unit F25.

The primary vehicle information acquisition unit F21 retrieves vehicle information on the primary vehicle from the vehicular sensor 30 and the GNSS receiver 40. The vehicle information on the primary vehicle includes, for example, a traveling speed, a traveling direction, and a present position of the primary vehicle. The packet error information acquisition unit F22 receives a message, which indicates occurrence of a packet error, from the communication control unit F1.

The communication control unit F1 extracts, from the received packet, a terminal ID of another vehicle and the vehicle information on the other vehicle, from which the received packet is sent. The other-vehicle information acquisition unit F23 retrieves the extracted the terminal ID and the extracted vehicle information. The other-vehicle information acquisition unit F23 associates the vehicle information on the other vehicle, which is extracted from the received packet, with the terminal ID of the sender of the received packet, and stores the associated vehicle information and the terminal ID in a memory device. In this way, the assist processing unit F2 distinguishes information on a vehicle, which exists in the surroundings of the primary vehicle, from information on another vehicle, which exists in the surroundings of the primary vehicle. Thus, the assist processing unit F2 manages the distinguishable information on other vehicles.

When the RF unit 13 receives a packet sent from a certain vehicle successfully in a state where the packet can be demodulated and when the other-vehicle information acquisition unit F23 retrieves information on the other vehicle successfully, the assist processing unit F2 is enabled to recognize the certain vehicle. That is, another vehicle, which is recognized by the assist processing unit F2 to exist in the surroundings of the primary vehicle, is a vehicle, from which a packet is received successfully, among other vehicles in the surroundings of the primary vehicle.

The collision forecasting unit F24 specifies a positional relationship between the primary vehicle and another vehicle according to information on the primary vehicle and the vehicle information on the other vehicle, which is retrieved with the other-vehicle information acquisition unit F23. Thus, the collision forecasting unit F24 calculates a possibility of collision between the primary vehicle and the other vehicle. When the possibility of collision is greater than a predetermined threshold, the collision forecasting unit F24 determines that a possibility of collision between the primary vehicle and the other vehicle exists.

Furthermore, when determining that a possibility of collision between the primary vehicle and the other vehicle, which is an object of the present processing, exists, the collision forecasting unit F24 calculates a remaining time (time to collision: TTC) to the collision. A generally known processing and a generally known method may be employed for calculating a possibility of collision and for calculating the TTC according to the vehicle information on the primary vehicle and the vehicle information on another vehicle. Therefore, detailed description of the processing and the method is omitted.

The notification processing unit F25 causes the display device 20 to notify a driver of the primary vehicle of predetermined information. Details of an operation of the notification processing unit F25 will be described in a description about a flowchart shown in FIG. 3.

(Receiving-Related Processing)

Figure 3:
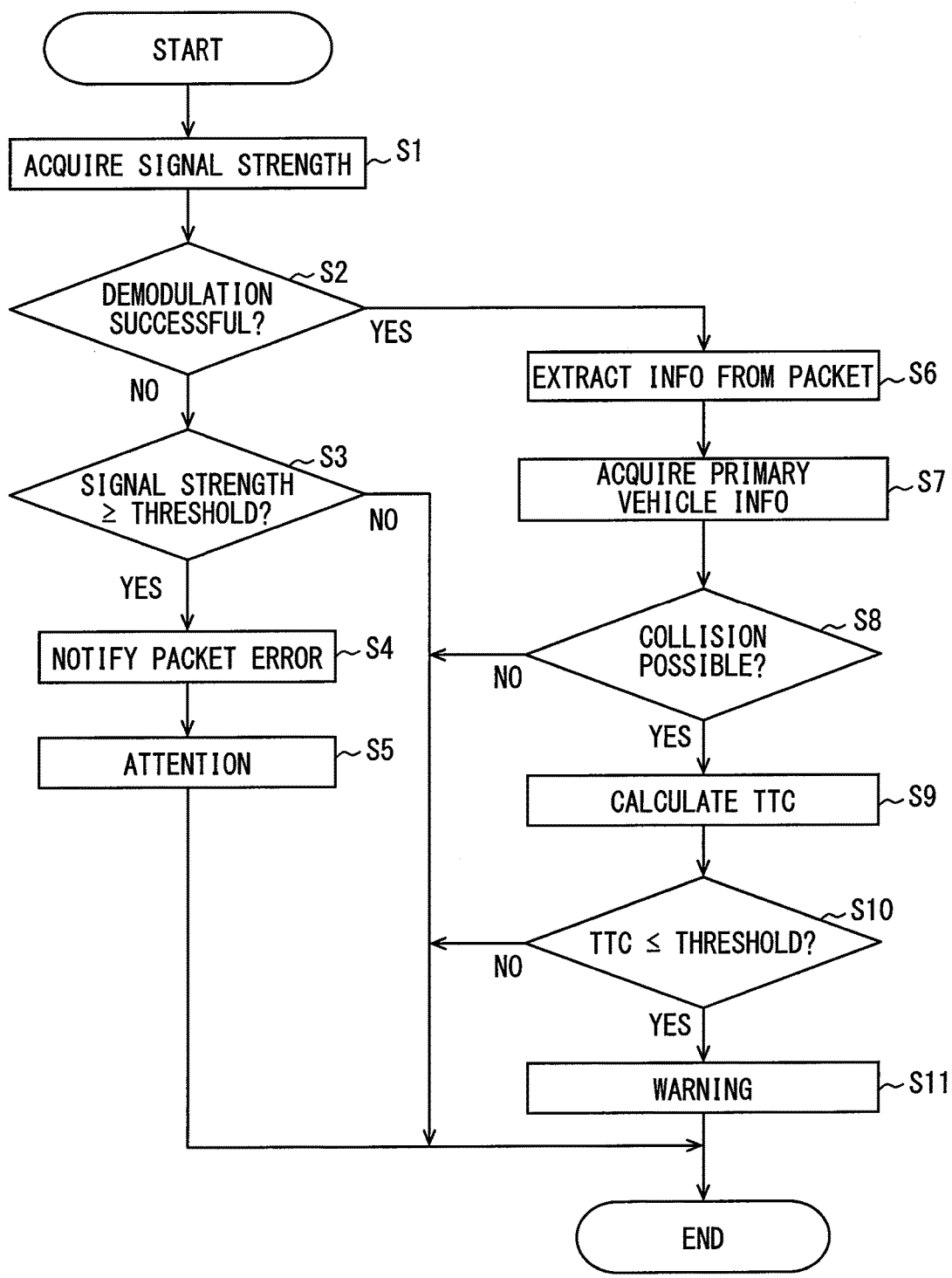
FIG. 3 is a flowchart showing a receiving-related processing executed by a control unit.

Subsequently, a receiving-related processing will be described with reference to the flowchart in FIG. 3. The control unit 11 implements the receiving-related processing in response to an event that the RF unit 13 receives a signal. The receiving-related processing shown in FIG. 3 may be started when the RF unit 13 receives a signal.

At step S1, the communication control unit F1 first retrieves, from the received signal strength detection unit 131, signal strength information on the signal which is received by the RF unit 13. Subsequently, the processing proceeds to step S2. At step S2, the communication control unit F1 retrieves, from the demodulation unit 14, a bit sequence as data obtained by demodulating the received signal. Further, the demodulation state determination unit F11 determines whether the demodulation unit 14 demodulates the received signal successfully. When the demodulation state determination unit F11 determines that the received signal is demodulated successfully, step S2 makes a positive determination (YES), and the processing proceeds to step S6. To the contrary, when the demodulation state determination unit F11 determines that the received signal is not demodulated successfully, step S2 makes a negative determination (NO), and the processing proceeds to step S3.

At step S3, the communication control unit F1 determines whether the received signal strength of the received signal is greater than or equal to the predetermined strength threshold. When the received signal strength is greater than or equal to the predetermined strength threshold, step S3 makes a positive determination (YES) and the processing proceeds to step S4. To the contrary, when the received signal strength is not greater than or equal to the predetermined strength threshold, step S3 makes a negative determination (NO) and the processing terminates. At step S4, the communication control unit F1 sends a message, which indicates occurrence of a packet error, to the assist processing unit F2. Subsequently, the processing proceeds to step S5.

At step S5, the notification processing unit F25 implements an attention attracting processing. The attention attracting processing is to notify multiple other vehicles existing around the primary vehicle. Specifically, the attention attracting processing is to cause the display device 20 to indicate a message and/or an image, which indicates possibility of multiple other vehicles existing around the primary vehicle.

The present embodiment employs a configuration to cause the display device 20 to indicate a predetermined image and/or a predetermined message thereby to notify a driver of multiple other vehicles existing in the surroundings of the primary vehicle. It is noted that, the configuration of the notification is not limited to the present example. Another employable configuration may be configured to activate and/or to blink an indicator, which includes an LED and/or the like thereby to notify a driver of multiple other vehicles existing in the surroundings of the primary vehicle. Another employable configuration may be configured to utilize voice and/or vibration to notify a driver of existence of a vehicle in the surroundings of the primary vehicle. On completion of step S5, the processing terminates.

At step S6, the communication control unit F1 extracts, from the received and demodulated packet, the vehicle information on another vehicle (sender vehicle), which is the sender, and the terminal ID, which indicates the sender vehicle. Thus, the processing proceeds to step S7. At step S7, the primary vehicle information acquisition unit F21 retrieves the vehicle information on the primary vehicle. Subsequently, the processing proceeds to step S8.

At step S8, the collision forecasting unit F24 determines the possibility in which the primary vehicle makes physical contact with the sender vehicle, according to the vehicle information on the primary vehicle and the vehicle information on the sender vehicle. When the collision forecasting unit F24 determines that the primary vehicle makes physical contact with the sender vehicle, step S8 makes positive determination (YES). Subsequently, the processing proceeds to step S9. To the contrary, when the collision forecasting unit F24 determines a possibility of physical contact between the primary vehicle and the sender vehicle to be zero or to be less than or equal to a predetermined threshold, step S8 makes a negative determination (NO). Subsequently, the processing terminates.

At step S9, the collision forecasting unit F24 calculates the TTC according to the vehicle information on the primary vehicle and the vehicle information on the sender vehicle. Subsequently, the processing proceeds to step S10. At step S10, the notification processing unit F25 determines whether the TTC is less than or equal to a predetermined threshold. The predetermined threshold is, for example, 7 seconds. When the calculated TTC is less than or equal to the predetermined threshold, step S10 makes a positive determination (YES). Subsequently, the processing proceeds to step S11. To the contrary, when the calculated TTC is greater than the predetermined threshold, step S10 makes a negative determination (NO). Thus, the processing terminates.

At step S11, the notification processing unit F25 implements a collision warning processing. The collision warning processing is to warn a driver of that the primary vehicle may collide with the sender vehicle at a high possibility. Specifically, the collision warning processing is to cause the display device 20 to indicate a message and/or an image, which indicates existence of another vehicle, which has a possibility to collide against the primary vehicle, around the primary vehicle.

It is noted that, the notification implemented in the collision warning processing is to appeal the warning to a driver further intensely than the notification implemented in the attention attracting processing. In other words, the notification implemented in the attention attracting processing is to appeal the warning to a driver further moderately than the notification implemented in the collision warning processing. In order to appeal the warning to a driver further intensely with a voice and/or a mere sound, a sound volume of the warning may be further increased. In order to appeal the warning to a driver further intensely with a vibration, an intensity of the vibration may be further increased. In order to appeal the warning to a driver further intensely with an indicator including, for example, an LED, an indication mode may be intensified to enhance its impact. Specifically, an indication color may be intensified, and/or a blink interval may be reduced to enhance an impact of the warning. The warning may be implemented in a mode other than those exemplified presently.

As follows, effect of the present embodiment produced by implementing the above receiving-related processing will be described with reference to FIG. 4.

Figure 4:
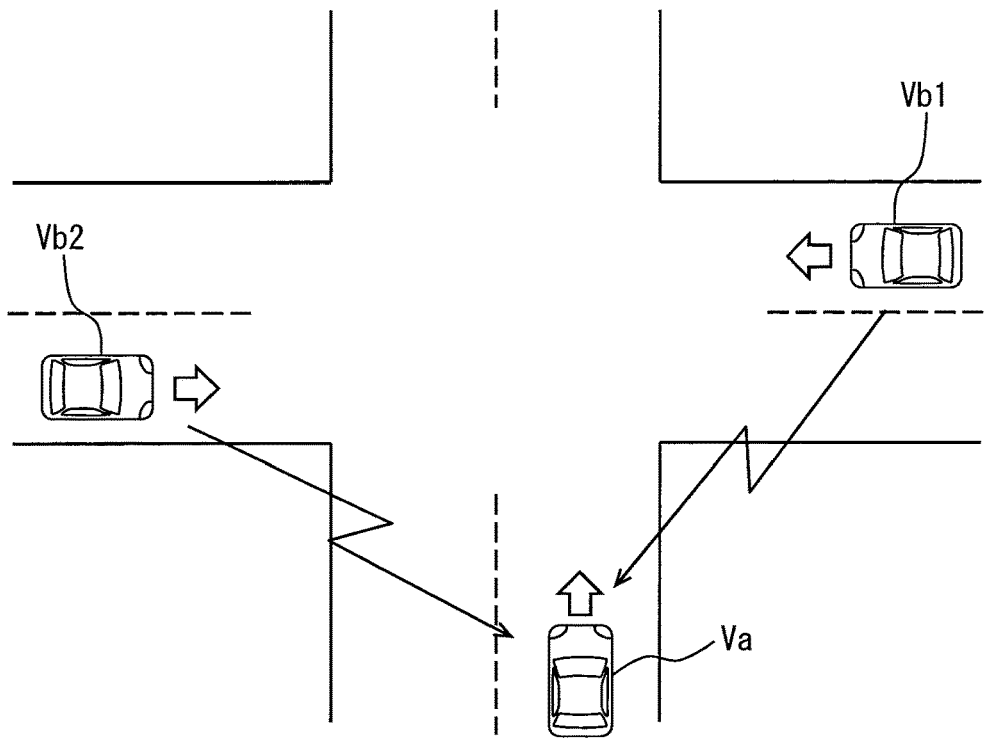
FIG. 4 is a view for describing an effect of the present embodiment.

FIG. 4 shows a condition where the primary vehicle approaches an intersection. A reference Va indicates the primary vehicle. In FIG. 4, references Vb1 and Vb2 indicate other vehicles. The other vehicles Vb1 and Vb2 travel on a cross road, which intersects with a road on which the primary vehicle Va travels. The other vehicles Vb1 and Vb2 also approach the intersection. That is, FIG. 4 shows a condition in which multiple vehicles including the primary vehicle Va approach the same intersection.

In the condition shown in FIG. 4, the other vehicle Vb1 does not exist in a wireless-communications area of the other vehicle Vb2, and the other vehicle Vb2 does not exist in a wireless-communications area of the other vehicle Vb1. That is, the other vehicle Vb1 and the other vehicle Vb2 are in a positional relationship of so-called the hidden node problem in which the other vehicle Vb1 and the other vehicle Vb2 cannot receive a packet from each other. It is further noted that the primary vehicle exists in the wireless-communications areas of both the other vehicles Vb1 and Vb2.

In the present state, a time point, at which the other vehicle Vb1 sends a packet, may overlap with a time point, at which the other vehicle Vb2 sends a packet. In this case, the packets may collide against each other to cause a packet collision. Consequently, the primary vehicle Va may not receive the packets successfully.

When the packet collision occurs, a signal waveform of the packet may be disrupted. Consequently, the packet cannot be demodulated correctly. As a result, the assist processing unit F2 of the primary vehicle Va cannot implement a processing, such as a calculation of a possibility of collision, based on the packet sent from the other vehicle Vb1 and/or the packet sent from the other vehicle Vb2.

To the contrary, according to the present embodiment, when receiving the message, which indicates occurrence of a packet error, from the communication control unit F1 at step S4, the notification processing unit F25 implements the attention attracting processing at step S5. Thus, the notification processing unit F25 notifies a driver of existence of another vehicle in the surroundings of the primary vehicle.

Therefore, the configuration of the present embodiment enables to notify a driver of the primary vehicle that another vehicle may exist in the surroundings of the primary vehicle, even when the received signal cannot be demodulated correctly due to packet collision and/or the like.

Generally, a driving assist device including the driving assist device 10 of the present embodiment recognizes existence of another vehicle Vb1 and/or another vehicle Vb2 according to vehicle information, which is specified by a packet sent from the other vehicle.

For example, in an assumable state, the primary vehicle Va enters the wireless-communications areas of the other vehicle Vb1 and another vehicle Vb2, and the primary vehicle Va does not receive a packet from both the other vehicle Vb1 and the other vehicle Vb2. In the assumable state, the packet from the other vehicle Vb1 and the packet from the other vehicle Vb2 may collide against each other. In this case, the assist processing unit F2 cannot recognize existence of the other vehicle Vb1 and the other vehicle Vb2 continually for a period.

Consequently, even though the other vehicle Vb1 and the other vehicle Vb2 exist near the primary vehicle Va, the assist processing unit F2 may not recognize existence of the other vehicles Vb1 and Vb2.

A driving assist device of a comparative example may implement a collision warning processing and/or the like according to a positional relationship between the primary vehicle and another vehicle. In the comparative example, the driving assist device recognizes existence of the other vehicle by receiving a packet, which is sent from the other vehicle. Therefore, the driving assist device of the comparative example cannot warn a driver of another vehicle, which cannot be recognized due to packet collision, as described with reference to FIG. 4.

To the contrary, according to the configuration of the present embodiment, the notification processing unit F25 notifies a driver of existence of another vehicle in the surroundings of the primary vehicle when receiving the message, which indicates occurrence of a packet error, from the communication control unit F1. The communication control unit F1 sends the message, which indicates occurrence of a packet error, when the demodulation state determination unit F11 determines that a received signal is not demodulated successfully and when the received signal strength of the received signal is greater than or equal to the predetermined strength threshold.

When a signal, which is at a received signal strength greater than or equal to the predetermined strength threshold, cannot be demodulated correctly, it is presumable that collision occurs between packets sent from multiple other vehicles. In addition, when collision occurs between packets sent from multiple other vehicles, it is presumable that multiple other vehicles exist near the primary vehicle.

That is, the configuration of the present embodiment enables to notify a driver of existence of another vehicle in the surroundings of the primary vehicle, even in a case where the primary vehicle Va does not receive a packet from another vehicle Vb1 and another vehicle Vb2 successfully due to packet collision and/or the like.

The present disclosure is not limited to the above-described embodiment. The subsequent embodiments are also included in the technical scope of the present disclosure. Furthermore, various modification of the present disclosure may be practiced in addition to the above and following disclosures.

First Modification

In the above-described receiving-related processing, the attention attracting processing at step S5 may be implemented when the number of another vehicle, which is recognized by the assist processing unit F2 to exist in the surroundings of the primary vehicle, is zero or one.

In general, when multiple other vehicles exist in the surroundings of the primary vehicle and even when the multiple other vehicles are not in the hidden terminal relationship, packet collision may occur in a case where multiple other vehicles performs carrier sense at the same time point. That is, even when packet collision occurs, another vehicle, which the assist processing unit F2 does not recognize, does not necessarily exist in the surroundings of the primary vehicle.

To the contrary, packet collision may occur in a case where the number of another vehicle, which the assist processing unit F2 recognizes to exist around the primary vehicle, is zero or one. In this case, another vehicle, which the assist processing unit F2 does not recognize, exists.

Therefore, only when the number of another vehicle, which exists around the primary vehicle, is zero or one, the attention attracting processing may be implemented in response to occurrence of packet error. In this way, unnecessary attention attracting operation may be avoided.

Second Modification

In the above-described example, the driving assist device 10 implements the vehicle-to-vehicle communications. The disclosure is not limited to the above-described example. The driving assist device 10 may have a function to implement generally known road-to-vehicle communications with a roadside apparatus, which is located along a road or located on a road. Specifically, the RF unit 13 may have a configuration to receive a packet sent from a roadside apparatus.

It is noted that, the road-to-vehicle communications employs a carrier frequency, which is the same as a carrier frequency of the vehicle-to-vehicle communications. That is, in a system employing the driving assist device 10, both the vehicle-to-vehicle communications and the road-to-vehicle communications share the same frequency channel.

Figure 5:
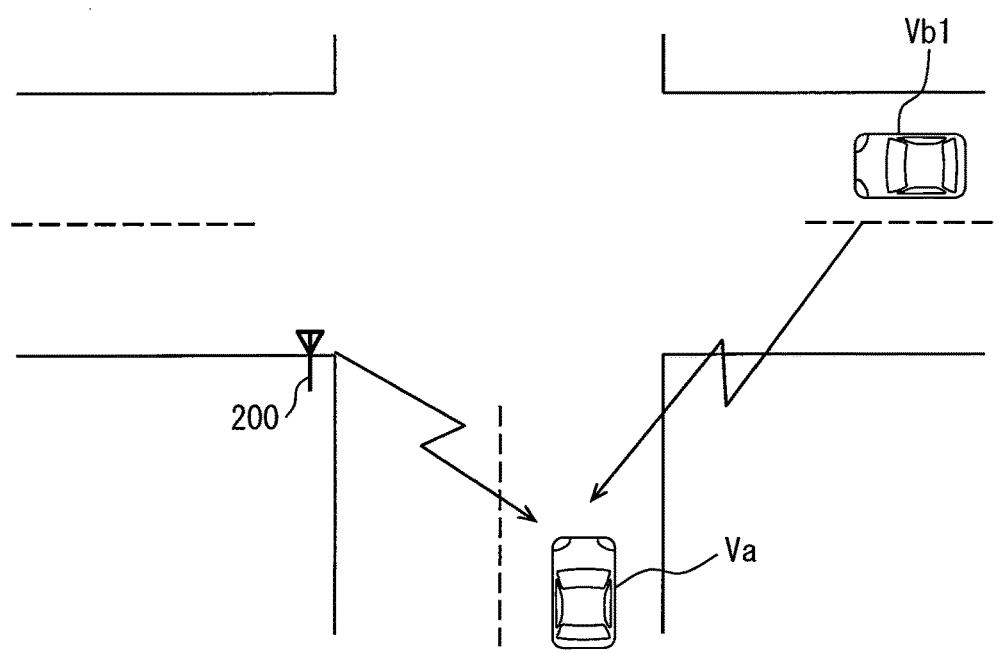
FIGS. 5 and 6 are views for describing an operation of a second modification.

In the present embodiment, as shown in FIG. 5, collision may occur between a packet sent from the roadside apparatus 200 and a packet sent from another vehicle Vb1, in addition to collision between a packet sent from another vehicle Vb1 and a packet sent from another vehicle Vb2.

Even in such a case, a receiving-related processing, which is similar to that in the above-described embodiment, may be implemented to enable to notify a driver of existence of another vehicle in the surroundings of the primary vehicle. In this example, another vehicle is another vehicle Vb1.

Figure 6:
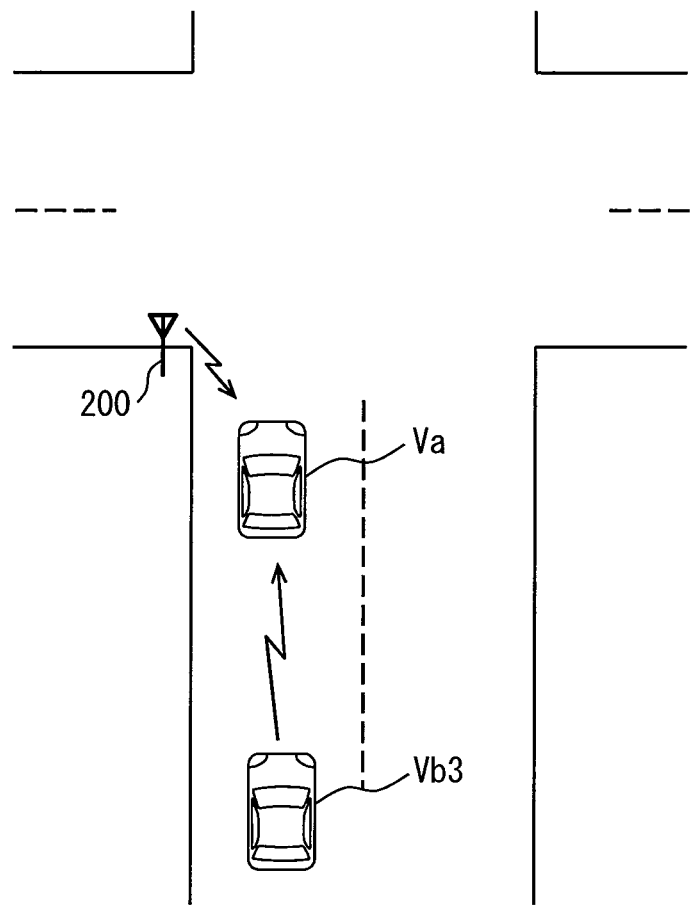

It is noted that, the case where a packet sent from the roadside apparatus 200 collides against a packet sent from another vehicle is not limited to the example shown in FIG. 5. For example, as shown in FIG. 6, another vehicle Vb3, which travels behind the primary vehicle Va, and a roadside apparatus 200, which is equipped at an intersection, to which the primary vehicle approaches, may be in the hidden terminal relationship. In this example, a packet sent from another vehicle Vb3 and a packet sent from the roadside apparatus 200 may collide against each other.

When packet collision occurs, the contents of the packet, such as the terminal ID of a sender, cannot be retrievable. Therefore, in this case, it is unclear whether a sender of the packet is another vehicle, which is known by the assist processing unit F2. It is noted that, implementation of the above-described receiving-related processing enables to notify a driver of existence of another vehicle or a roadside apparatus, which may be in the hidden terminal relationship.

According to the present disclosure, the receiving unit 13 receives the signal in the frequency band used in vehicle-to-vehicle communications. The demodulation unit 14 demodulates to the signal received with the receiving unit. The received signal strength detection unit 131 detects the received signal strength of the signal received with the receiving unit. The demodulation state determination unit F11 determines whether the signal, which is received with the receiving unit, is demodulated successfully. The notification processing unit F25 notifies a driver of a possibility of existence of another vehicle in the surroundings of the primary vehicle, when the demodulation state determination unit determines that the received signal is not demodulated successfully, and when the received signal strength of the signal is greater than a predetermined strength threshold, which is for determining whether signals sent from multiple other vehicles collide against each other.

In the configuration, the notification processing unit notifies a driver of the primary vehicle that another vehicle possibly exists in the surroundings around the primary vehicle on determination that the received signal is not demodulated successfully and when the received signal strength of the signal is greater than the predetermined strength threshold.

When communication packets sent from multiple other vehicles collide against each other, a signal waveform may be disrupted and cannot be demodulated successfully. It is noted that, the received signal strength at this time may be a sufficiently high value.

Therefore, the condition, in which the signal is not demodulated correctly even though the received signal strength is greater than or equal to a predetermined threshold, implies occurrence of collision between the communication packets sent from the multiple other vehicles. In addition, the occurrence of collision between the communication packets, which are sent from multiple other vehicles, implies existence of multiple other vehicles near the primary vehicle.

That is, the condition, in which the received signal is determined not to be demodulated successfully, and the received signal strength of the signal is greater than or equal to the predetermined strength threshold, implies existence of multiple other vehicles near the primary vehicle.

Therefore, the present configuration enables to notify a driver of the primary vehicle that another vehicle exists in the surroundings around the primary vehicle even in a case where the received signal cannot be demodulated correctly.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A driving assist device for a primary vehicle, comprising:
    a receiving unit configured to receive a signal via vehicle-to-vehicle communications and/or road-to-vehicle communications using communication packets;
    an assist processing unit configured to recognize another vehicle around the primary vehicle based on information specified by the communication packets received with the receiving unit;
    a demodulation unit configured to demodulate the signal received with the receiving unit;
    a received signal strength detection unit configured to detect a received signal strength of the signal received with the receiving unit;
    a demodulation state determination unit configured to determine whether the signal received by the receiving unit is demodulated successfully;
    a communication control unit configured to determine whether a packet collision between the communication packets received with the receiving unit occurs; and
    a notification processing unit configured to perform an attention attracting processing to have a driver of the primary vehicle pay attention to other vehicles around the primary vehicle upon determining by the communication control unit that the packet collision occurs, wherein
    the communication control unit determines that the packet collision occurs in response to a combination of (i) the received signal strength detection unit detecting that the received signal strength is greater than or equal to a predetermined strength threshold and (ii) the demodulation state determination unit determining that the signal is not demodulated successfully, and
    the notification processing unit is configured to notify the driver that there are at least two vehicles around the primary vehicle in response to a combination of (i) the communication control unit determining that the packet collision occurred and (ii) the assist processing unit recognizing zero or one vehicle around the primary vehicle.
    (i) the communication control unit determines that the packet collision occurs; and
    (ii) the assist processing unit recognizes zero or one other vehicle around the primary vehicle.

2. The driving assist device of claim 1, wherein
the driving assist device is used in a system configured to implement the road-to-vehicle communications using a frequency in a frequency band used in the vehicle-to-vehicle communications, and
the receiving unit is configured to receive the communication packets sent from another vehicle and the communication packets sent from a roadside apparatus.

3. The driving assist device of claim 1, wherein
the demodulation state determination unit determines that the signal is not demodulated successfully in a case where:
    a bit sequence, which is generated by the demodulation unit by demodulating the signal received with the receiving unit, is not in compliance with a predetermined format, which is employed in the vehicle-to-vehicle communications; or
    the demodulation unit cannot implement correction of the signal using an error correcting code.

4. The driving assist device of claim 1, further comprising
a collision forecasting unit configured to determine a possibility of collision with the other vehicles according to the signal demodulated with the demodulation unit, wherein
the collision forecasting unit is configured to determine a positional relationship with the other vehicles according to the signal demodulated with the demodulation unit.

5. The driving assist device of claim 1, wherein
the receiving unit is configured to receive the communication packets sent from the other vehicles, and
the demodulation state determination unit is configured to determine that the communication packets sent from the other vehicles collide against each other to disrupt a signal waveform of the signal on determination that the signal cannot be demodulated successfully.

6. The driving assist device of claim 1, further comprising
a collision forecasting unit configured to determine a possibility of collision with the other vehicles according to the signal demodulated with the demodulation unit, wherein
the collision forecasting unit is configured to calculate a remaining time to collision with the other vehicles according to the signal demodulated with the demodulation unit, and
the notification processing unit is configured to implement a collision warning processing to implement an warning assist on determination that:
the demodulation state determination unit determines that the signal is demodulated successfully; and
the remaining time is less than or equal to a predetermined threshold.

7. The driving assist device of claim 1, further comprising:
a collision forecasting unit configured to determine whether the primary vehicle collides with another vehicle possibly according to the signal demodulated with the demodulation unit, wherein
the notification processing unit is configured to warn the driver of that the primary vehicle collides with the other vehicle possibly in response to a combination of:
the demodulation state determination unit determining that the signal received by the receiving unit is demodulated successfully; and
the collision forecasting unit determining that the possibility of the occurrence of the collision between the primary vehicle and the other vehicle increases, and
the warning provided with the driver by the notification processing unit is different from the notification provided with the driver by the notification processing unit.

8. The driving assist device of claim 7, wherein
the warning is emphasized as compared to the notification by at least one of increasing a sound volume, increasing an intensity of the vibration, intensifying an indication color, and reducing a blink interval of indication.

9. A driving assist device for a primary vehicle, comprising:
a receiving unit configured to receive a signal via vehicle-to-vehicle communications and/or road-to-vehicle communications using communication packets;
an assist processing unit configured to recognize another vehicle around the primary vehicle based on information specified by the communication packets received with the receiving unit;
a demodulation unit configured to demodulate the signal received with the receiving unit;
a received signal strength detection unit configured to detect a received signal strength of the signal received with the receiving unit;
a demodulation state determination unit configured to determine whether the signal received by the receiving unit is demodulated successfully;
a communication control unit configured to determine whether a packet collision between the communication packets received with the receiving unit occurs; and
a notification processing unit configured to perform an attention attracting processing to have a driver of the primary vehicle pay attention to other vehicles around the primary vehicle upon determining by the communication control unit that the packet collision occurs, wherein
the communication control unit determines that the packet collision occurs when (i) the received signal strength detected by the received signal strength detection unit is greater than or equal to a predetermined strength threshold and (ii) the demodulation state determination unit determines that the signal is not demodulated successfully, and
the notification processing unit is configured:
to notify the driver that there are at least two vehicles around the primary vehicle in response to a combination of
the communication control unit determining that the packet collision occurred and
the assist processing unit recognizing zero or one vehicle around the primary vehicle;
not to notify the driver that there is another vehicle around the primary vehicle in response to a combination of
the communication control unit not determining that the packet collision occurred and
the assist processing unit recognizing zero vehicle around the primary vehicle; and
not to notify the driver that there is a first vehicle around the primary vehicle in response to a combination of
the communication control unit not determining that the packet occurred and
the assist processing unit recognizing a second vehicle around the primary vehicle.

* * * * *